United States Patent Office 3,259,571
Patented July 5, 1966

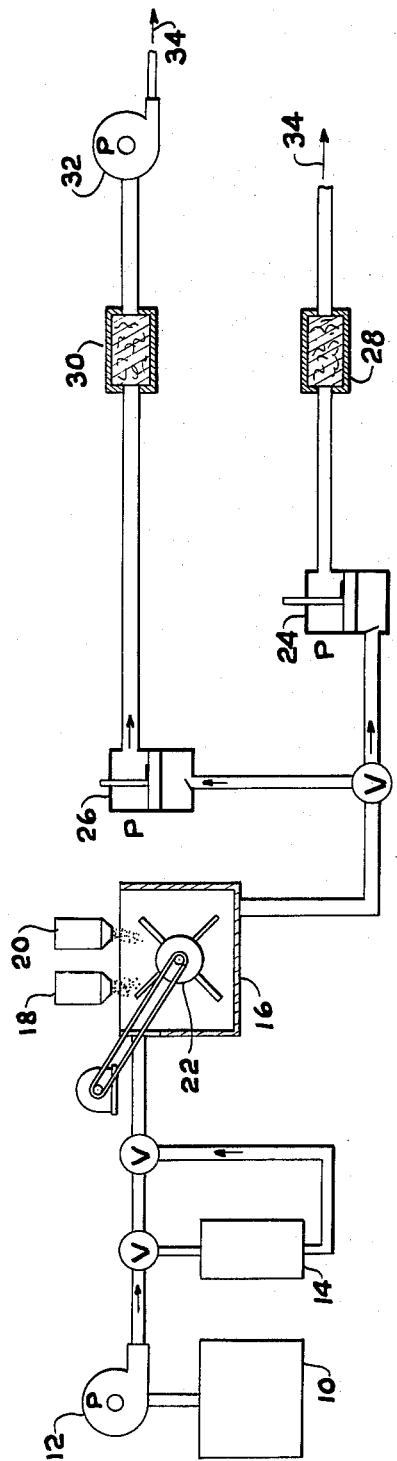

3,259,571
METHOD FOR REMOVING IRON FROM WATER
William C. Marshall, Flushing, N.Y., George R. Bell, Martinsville, N.J., and George J. Coogan, Everett, Mass., assignors to Johns-Manville Corporation, New York, N.Y., a corporation of New York
Filed Jan. 7, 1963, Ser. No. 249,782
6 Claims. (Cl. 210—59)

This invention relates to the removal of iron as a contaminant from water supplies, new filter aid products for effectively achieving the removal and the process of preparing such filter aids. The invention is effective for both ground water and surface water supplies and mixtures thereof.

As generally understood, filtration is the removal of suspended particles from a liquid by forcing the liquid under a pressure differential through a filter medium. Slow sand filters were the first water filter structures devised to accomplish this on a large scale and in many ways simulated percolation through naturally occurring sand such as that of the banks or galleries along the edges of rivers or other water sources. These structures, however, have several disadvantages including such low capacity that large areas and expensive construction were required, and more significantly, the inability to handle many types of contamination found in water supplies.

As the technology advanced, practice has involved filtering water through structures containing much coarser sand acting largely as straining devices, and have been termed "rapid sand filters." An important aspect of this technique is that these filters have little inherent clarifying capacity of themselves and the basis for clarification must be provided by prior treatment of the water with appropriate chemicals and processes. That is, the suspended matter therein was treated to collect or coalesce into sufficiently large agglomerates so as to settle out and be substantially removed in advance of the rapid sand filter. Such a process characteristically includes chemical feeders, flash mixing basins, slow mixing chambers in which the agglomerates form, sedimentation basins to remove the agglomerates and finally the filters themselves, which take out the larger sized contaminants. The material thus entrapped in the sand is said by some to lend its activity to the clarification mechanism of sand filters, but almost never is unpretreated water filtered through rapid sand filters if high quality filtered water is desired. It is commonly understood in water works practice that the term "sand filter plant" includes the pretreatment works which are substantially larger and more expensive than the sand filter structures themselves.

Recently, innovations have been put forth purporting to improve rapid sand filter performance when in reality they are improvements to the pretreatment process which precedes the actual filter operation. The reason for this becomes apparent when it is understood that any appreciable amount of residue not removed by settling from the filter influent will tend to quickly clog the filter producing impractical head losses in a relatively short time.

While the above might be termed the traditional approach to water filtration, technologies long used by other industries are presently being adapted to water clarification. Specifically, the principle of filter aid filtration which has long demonstrated many advantages in other fields has shown significant economic and technological advances in water clarification.

As noted above, filtration theory calls for the liquid filtrate to pass through the openings of a filter medium, which may be a septum of cloth, screen, etc., while the suspended particles are to remain behind. However, in reality, the finer suspended particles also pass with the liquid as the coarse openings of the medium are unable to retain them, while the larger particles do become filtered and remain upon the medium, soon to clog the openings and eventually slow down or completely stop the flow of liquid through the filter.

These difficulties have been for the most part overcome by adding a small amount of filter aid to the liquid to be filtered. By so doing, the filter aid functions to form continuously a porous cake upon the filtering surface and in actuality to entrap impurities by various mechanisms, such as by surrounding each particle of slimy, gummy, or squashy solid to prevent the blinding over of the filter surface. The properties of the filter aid, e.g., porosity, fineness, diversity of shape, incompressibility, etc., make it unique for this purpose. A particularly important feature of filter aid filtration is that the pores in the surface of the filter aid cake are far smaller than those in the filter medium, thereby enabling the removal of some very substantial proportion of the suspended particles. The portion removed will, of course, be a function of the size and nature of the particles to be filtered and the porosity and inherent clarifying ability of the particular filter aid. The filter aid and additional ingredients added and mixed with the water to be filtered to assist in the filtration have been termed by the art as the "body feed."

In order to increase the initial efficiency of the filtering process, a precoat of filter aid particles is provided on the filter septum in addition to the incorporation of particles within the liquid to be filtered. This keeps the main filter cake containing the impurities from coming into direct contact with the filter medium and consequently prevents the gummy particles from clogging the medium and lessening the filtration efficiency in the manner mentioned above.

The materials most generally used as filter aids are diatomaceous silica, perlite, other siliceous materials, carbon, and fibrous matter such as asbestos and cellulose.

In one process of filtering water supplies, it has become conventional to form a mixture of liquid containing the suspended impurities with a particular filter aid such as diatomaceous silica. As mentioned, the purpose of the filter aid is to impart continually a new filtering surface upon the filtering medium and thereby increase the efficiency of the filtration process by increasing the amount of the impurities removed and likewise increasing the length of the filtration cycle. Some difficulties remain, however, due to the fact that even with the use of filter aid it is sometimes difficult and economically impossible to remove certain impurities from water supplies. Such impurities are generally in solution or colloidally dispersed rather than in suspension.

One such problem area has been that of the presence of iron in water. In amounts in excess of 0.3 parts per million, it can cause undesirable taste, discoloration in clothes and plumbing fixtures, incrustation in water systems, discoloration of manufactured products such as textiles or paper, and other difficulties. Unfortunately, the presence of soluble iron is a common occurrence particularly in well water and thus is a prevalent problem in many areas.

Iron is generally present in the ferrous state which is its most soluble form. Problems arise when the water contacts air, chlorine, or other chemicals capable of oxidizing the ferrous iron to the less soluble ferric state. Ferric hydroxide is virtually insoluble and is precipitated by the oxidization reaction. This is the familiar red-brownish or rusty appearance on sinks, swimming pools, clothing, and the like. Historically, endeavors to overcome this problem have ben attempted in one of these ways.

Initially, sources of iron-free water were found and used. Unfortunately, however, wells supplying waters which were iron-free when first drilled frequently became iron contaminated with time and use. In fact, many areas are fully of capped wells abandoned for this very reason. Likewise, unfortunately, in many areas, iron-free water was just not to be found where needed.

A second approach was to treat the water so as to prevent the precipitation of iron when the water is aerated or chlorinated. Many of the so-called sequestering or chelating agents will work, the most common are the mixtures of polyphosphates. Such methods have been applicable to both private residential well supplies and to some small community systems. Generally, however, they have been regarded as to expensive for larger cities or industrial plants.

The third and last method has been the treatment of water so as to remove the iron. This has been done by passage through special types of zeolite softeners; by aeration, pH adjustment, a contact period to permit oxidation, settling out of the precipitated iron followed by slow sand filteration, by cold lime or lime soda softening folowed by filteration; and by treatment with coagulating chemicals such as aluminum or iron salts and lime, soda ash or caustic to precipitate and settle the ferric hydroxide and filteration of the supernatant through rapid sand filters.

In Europe an additional method of removing iron from water has had limited application. This process involves passing of the well water through a granular bed of partially calcined dolomitic lime. In this process two points appear to be of particular importance: (1) the dolomitic lime must be calcined in such a way that its $MgCO_3$ is reduced ot MgO but at the same time not reducing the $CaCO_3$ to CaO, which would cause the grains of the bed to become cemented together; and (2) the process is limited to soft waters, e.g., up to 35 p.p.m. calcium hardness, because excessive hardness will also cause the grains of the bed to become cemented together. Early attempts to use straight magnesium oxides, or to use partially calcined dolomite in other than granular form are reported to have been unsuccessful and have not had commercial acceptance.

In the industry's review of the problem, a number of mechanisms for the inclusion of iron in water supplies have been postulated. Water is an unusually fine solvent and when it contains oxygen, sulfurous acid or carbon dioxide it will cause varying degrees of solution of heavy metals such as iron. The most commonly accepted mechanism for solution of iron from naturally occurring minerals suggests the solution of $CO_2$ in water with the resultant weak carbonic acid then dissolving iron to form ferrous bicarbonate, a very soluble compound. By this method naturally occurring deposits of iron, such as "bog iron," are said to readily contribute iron in the ferrous form to percolating, carbon dioxide-containing rainwater. Other minerals may be picked up by similar mechanisms and thereby contribute to the impurity content of ground water supplies and complicate the removal of a particular mineral constituent such as iron.

The aforementioned processes which comprise the prior art have generally functioned on the basis of reversing the just-described solution process by mechanically removing or chemically neutralizing the carbon dioxide and thereby destroying the principal mode for maintaining the iron in solution. A further chemical reaction with oxygen or another oxidizing chemical then oxidizes substantially all of the ferrous iron to some form of relatively insoluble ferric hydrate which can then be removed by mechanical filtration. It is known that some part of the ferrous iron need not be oxidized in order to be removed in some filtration processes, but in all of the processes described, with the possible exception of the bed of granular partially calcined dolomite for which the mechanism is not understood, some appreciable part of the iron must be in the ferric state prior to filtration.

It is therefore a principal object of this invention to provide a practical and economical means whereby the disadvantages of the foregoing iron removal filtration processes may be overcome.

It is a further object of this invention to provide a method of clarifying and substantially purifying water supplies whereby maximum iron removal effectiveness was achieved.

It is another object of this invention to provide a new method of producing substantially iron-free water supplies which will economically function in accordance with the advantages mentioned in the foregoing objects.

It is another object of this invention to provide a practical means of purifying iron contaminated water sources to render them useful both for potable and sensitive industrial purposes.

Additional objects and further scope of applicability of the present invention will become apparent in the detailed description given hereinafter, the preferred embodiment of which has been illustrated in the accompanying drawing by way of example only wherein;

The figure is a schematic view of the preconditioning and filtration equipment used in carrying out the instant invention.

It has now been determined that the foregoing objects may be satisfied and the above-mentioned problems overcome by providing a novel method of treating the iron contaminated water supply. It has been discovered that by utilizing a new concept of "preconditioning," the iron may be effectively removed by filter aid filtration. Specifically, the filter feed or liquid to be filtered is treated with small amounts of ingredients comprising powered active magnesium oxide, which may be in the form of calcined magnesite or partially calcined dolomite, and pulverrulent filter aid, or the class described above, by adding the ingredients thereto preferably under agitation and nominal retension, up to say 10 minutes and then subjecting the ingredients-containing water to standard filter aid filtration.

With continuing reference to the accompanying drawing wherein like reference numerals designated similar parts throughout, this invention may be utilized in the following manner. Water, from a source such as a well 10, is drawn by a centrifugal pump 12 and passed to an aerating tower 14 or alternatively directly into a preconditioning tank 16; if the water is first passed to the aerating tower it is then directly discharged into the preconditioning tank. Two feeding devices, 18 and 20, are mounted above the tank 16 and permit the feeding of the powdered magnesium oxide and filter aid, respectively. Upon discharge of the chemical and filter aid into the tank, the contents are retained under agitation, as by agitator 22, for about 10 minutes. The preconditioned water is then pumped by pumps 24 and 26 to either of two, or both commercial filter units 28 and 30. In the first one 28, a pressure filter, the water is forced with sufficient pressure to overcome both the resistance of the filter itself and the gradually increasing resistance of the accumulating filter cake. In the second one 30, a gravity-vacuum filter, the water is added by the low lift pump 26, and forced by a combination of gravity and vacuum, the latter which is created by the suction lift of a centrifugal pump 32 with sufficient capacity to overcome the gradually increasing resistance to the accumulating filter cake. From the filters the water is pumped to end use 34. It is to be understood that rather than disperse the filter aid and magnesium oxide separately, the same results could be accomplished through a mixture of the two.

It has also been determined that further advantages may be obtained if a precoat of filter aid and powdered magnesium oxide is used.

The amount of active magnesium oxide used varies in accordance with the amount of iron contaminant and the desired degree of removal to be accomplished. The amount of magnesium oxide required, while a function of the form of the material, i.e., fineness of division, degree of purity, etc., is not necessarily stoichiometric with respect to the amount of iron to be removed. However, it has been found that between 2.5 and 60 parts per million of liquid to be filtered are generally sufficient to reduce a normal contaminant concentration of iron to acceptable drinking water standards of the U.S.P.H.S. or less. By active magnesium oxides is meant magnesium oxides capable of reacting with the iron of a water supply and include those resulting from calcination of naturally occurring or chemically precipitated magnesites or magnesium carbonates, and partially calcined dolomite (calcined to decompose the magnesium carbonate but not the calcium carbonate), and other forms of chemically prepared magnesium oxide, e.g., calcined magnesium hydroxide.

The filter aid used in the body feed may be any one of the commercially available filter aids such as diatomaceous silica, perlite, or other filter aids or mixtures of the same. The amount of filter aid added is again dictated by the liquid being treated and the desired result. However, it has been found that between 5 and 100 parts per million of liquid to be filtered is generally satisfactory with the above-described amount of magnesium oxide.

A more complete understanding of the invention will become apparent from the following examples of the operation within the scope of the invention. In all cases the filtration rate was controlled at one gallon per square foot per minute (g.s.f.m.) and all parts are given as parts per million of liquid to be filtered unless otherwise specified.

*Example I*

Using the equipment train of the figure, including aeration for reduction of $CO_2$, 60 g.p.m. of well water containing 1.3 mg./l. Fe entirely in solution was introduced into the system. Twenty mg./l. of calcined magnesite and 60 mg./l. of a commercially available relatively permeable diatomaceous silica filter aid, were added to the preconditioning tank with detention of 10 minutes, and the 25 g.p.m. of resultant mixture was then filtered through each of the two 25 sq. ft. commercially available filters. Iron content was reduced to an average of 0.06 mg./l. or less over a period of 6.75 hours during which the head loss increase was less than 1.0 p.s.i. per hour.

*Example II*

Using the identical equipment arrangement of Example I on the same well water supply, but with the influent Fe content slightly increased to 1.4 mg./l., the quantities of calcined magnesite and filter aid were reduced to 5 mg./l. and 25 mg./l. respectively. Iron in the filtered water was reduced to less than .6 mg./l. in 15 minutes, less than 0.10 mg./l. in 45 minutes and all subsequent samples to less than this figure for the balance of the filtering cycles, which were 14.5 hours for the gravity-vacuum filter with its limited available differential pressure, and 24 hours for the pressure type filter. Head loss increases were identical for the two filters for the coincidental parts of their cycles and the overall rate of increase for the pressure filter was 1.1 p.s.i. per hour.

*Example III*

In precisely the same manner as in the foregoing examples, 12 mg./l. of calcined magnesite was added to water containing 1.4 mg./l. of iron in the preconditioning tank. No filter aid was added. When this water was filtered the iron content was promptly reduced but the head loss through the filter increased so rapidly that the cycle was discontinued after only one-half hour. It was estimated that the rate of head loss increase was greater than an impractical level 12.5 p.s.i. per hour. This showed that the combination with the filter aid is essential to the process.

*Example IV*

As a check on the foregoing Example III a new cycle was immediately begun with the conditions of the preceding cycle unchanged except that 30 mg./l. of diatomaceous silica filter aid was also added to the detention tank. In 2.5 hours, average Fe content of the filtered water was 0.06 mg./l. and rate of head loss increase was considerably less than 1.0 p.s.i. hour. This confirmed the conclusion that the combination with the filter aid is essential to the process.

*Example V*

Using the equipment of the preceding example, but with a water supply containing 9.8 p.p.m. Fe, the water was first aerated to remove $CO_2$ 40 p.p.m. of diatomaceous silica filter aid was added at the detention tank and the resulting mixture filtered. After 4 hours, while the head loss through the filter had increased less than 1 p.s.i. the Fe content of the filtered water was 7.4 p.p.m. and the cycle was abandoned. This again confirmed the necessity of using the combination of filter aid and magnesium oxide to achieve efficient iron removal.

*Example VI*

On a well water supply from a different area again using the equipment train for Example I, 6 p.p.m. of calcined magnesite and 20 p.p.m. of filter aid were added to aerated water in the detention tank. The filters promptly reduced 2.4 mg./l. of iron to 0.04 mg./l. or less with a cycle running 24 hours and the rate of head loss increase was 0.76 p.s.i. per hour for that period.

*Example VII*

The conditions of Example VI, except that the well water was not aerated to remove $CO_2$ and add oxygen, were substantially duplicated. Calcined magnesite at 7 mg./l. and diatomaceous silica filter aid at 18 p.p.m. in the preconditioning tank reduced iron through the filter from 2.7 mg./l. to an average of 0.05 mg./l. or less for a 24 hour period during which the average head loss increase was 0.83 p.s.i. per hour. This clearly established that preaeration is not necessary to the process, and a substantial number of similar runs have confirmed this.

*Example VIII*

The conditions of Example VII, i.e., no aeration, were repeated except that 7 mg./l. of ground uncalcined natural magnesite in place of calcined magnesite, along with 15 mg./l. of diatomaceous silica filter aid were added to the preconditioning tank. The initial iron concentration of 2.6 mg./l. was substantially unchanged at 2.5 mg./l. in the filtered water. This substantiated that some form of MgO rather than $MgCO_3$ is necessary for success of the process.

*Example IX*

The validity of the use of calcined magnesite in a preconditioning and filter aid filtration was established by the previous examples as practicable for waters containing less than 3.0 mg./l. of iron. A smaller 1 g.p.m. pilot plant capable of all of the functions of the previously described 60 g.p.m. unit, except for preaeration, was accordingly installed on a well water supply containing in excess of 7 mg./l. of iron. To the preconditioning tank were added 25 mg./l. calcined magnesite and 30 p.p.m. filter aid. On filtration the influent iron was reduced to 2.5 p.p.m. in 30 minutes and 0.3 to 0.4 mg./l. in 60 to 75 minutes and thence to less than 0.15 mg./l. at the end of 8 hours with an average head loss increase of only 0.34 p.s.i. per hour so that the cycle could have continued for many more hours.

*Example X*

The fact that the initial filtered water in Example IX contained, even briefly, more than the 0.3 mg./l. iron limit proposed by the U.S.P.H.S. for potable water posed a possible limitation on use of the process. The thought occurred that perhaps a part of the preconditioning process function could be improved upon by a temporary sharp increase in the amount of calcined magnesite in the system early in the filtering cycle. This concept was applied to a well water, without aeration, containing .75 to 1.0 mg./l. of iron. Here a diatomaceous silica filter aid precoat was applied to the filter at the rate of 0.1 lb. per sq. ft. of filtering surface as was usual prior to beginning preconditioned water filtration. However, in this instance a second precoat consisting of 0.05 lb. of filter aid and 0.01 lb. of calcined magnesite was next applied to the filter and only then was actual filtration of preconditioned water containing 6 mg./l. calcined magnesite and 10 mg./l. filter aid started. At two minutes, the filtrate contained only 0.3 mg./l. iron and at eight minutes less than 0.1 mg./l. a condition that prevailed for about half an hour even though the precoat had been applied from iron-containing well water. After rising briefly to 0.2 p.p.m. at one-half hour, the iron content rapidly dropped again to 0.1 mg./l. and remained at or below that value until time forced the termination of the filter cycle after 6 hours, at which time the rate of head loss increased had averaged only 0.15 p.s.i. per hour.

*Example XI*

The conditions of Example IX were repeated, except that no second precoat containing calcined magnesite was used, as a check on the effect of the second coat in another test. The water from the same well, containing 0.6 mg./l. Fe, was preconditioned with 10 mg./l. calcined magnesite and 15 mg./l. diatomaceous silica filter aid and a single precoat of filter aid was applied from iron-containing well water. The filtered water at two minutes contained 0.4 mg./l. Fe, at 15 minutes contained 0.3 mg./l. and finally reached 0.1 after 75 minutes. This clearly established the value of an initial short term high concentration of calcined magnesite to effect more complete Fe removal early in a filtering cycle or at other times of short duration.

Other means than a second precoat, e.g., a "slug" of magnesite injected into the filter line at the filter would be expected to accomplish the same purpose, but feeding magnesite at such high levels continuously to avoid the preconditioning step appears to be uneconomical.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. A method of clarifying water, particularly to remove soluble iron, comprising continually and uniformly adding to said water solid particulate body feed comprising powdered active magnesium oxide in an amount between 2.5 and 60 parts per million of liquid to be filtered and pulverulent filter aid in an amount between 5 and 100 parts per million of liquid to be filtered, mixing and retaining said water containing said active magnesium oxide and filter aid in a retention area to insure uniform distribution of said solid particles and to affix said iron on said solid particles, and passing said mixture-containing water through a filter septum to effect filtration.

2. A method as described in claim 1 wherein the actime magnesium oxide is calcined magnesite.

3. A method as described in claim 1 wherein the active magnesium oxide is partially calcined dolomite.

4. A method as described in claim 1 wherein the filter aid is selected from the group consisting of diatomaceous silica, perlite, and mixtures thereof.

5. A method as described in claim 1 wherein the filter is precoated with layers of filter aid and active magnesium oxide mixed with filter aid.

6. A method as described in claim 1 wherein the mixture-containing water is retained in the area for up to 10 minutes under mild agitation before filtration.

References Cited by the Examiner

UNITED STATES PATENTS

| | | | |
|---|---|---|---|
| 1,511,472 | 10/1924 | Hood et al. | 127—55 |
| 1,806,471 | 5/1931 | Kramer | 127—55 |
| 2,076,545 | 4/1937 | Caldwell | 252—457 |
| 2,468,188 | 4/1949 | Frankenhoff | 210—75 |
| 2,469,512 | 5/1949 | Naugle | 252—457 |
| 3,066,519 | 12/1962 | Boswinkle et al. | 68—18.1 |

FOREIGN PATENTS

| | | |
|---|---|---|
| 1,203,624 | 8/1959 | France. |

OTHER REFERENCES

"Diatomite Filtration for Removal of Iron and Manganese," Coogan, Jour. AWWA, Dec. 1962, vol. 54, effective date apparently June 19, 1962, pp. 1507–1517.

MORRIS O. WOLK, *Primary Examiner.*

M. E. ROGERS, *Assistant Examiner.*